July 6, 1937.  J. E. ROSENBERG  2,086,190
ENAMELWARE
Filed June 3, 1935
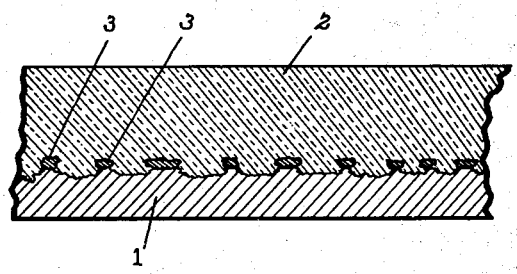
Fig. I
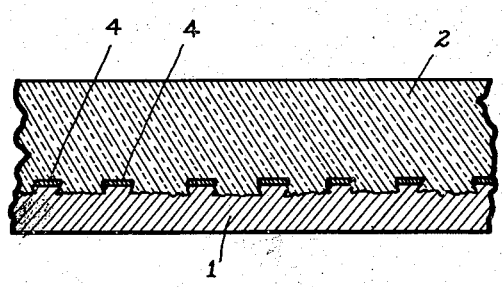
Fig. II
INVENTOR
Jacob E. Rosenberg
Jay Christy and Wharton
his attorneys Patented July 6, 1937

2,086,190

UNITED STATES PATENT OFFICE 2,086,190

ENAMELWARE

Jacob E. Rosenberg, Pittsburgh, Pa., assignor to The O. Hommel Company, a corporation of Pennsylvania Application June 3, 1935, Serial No. 24,706

3 Claims. (Cl. 91—73)

This invention relates to improvements in the production of glass-coated metal articles; and, while of general applicability, finds practical value in producing enamel ware—that is to say, articles and utensils of iron and steel, coated with glass. The object in view is an article of the nature indicated whose coating, ordinarily white or colorless, is bonded securely to the underlying metal. This application is, in part, a continuation of an application filed by me January 10, 1935, Serial No. 1,213.

The accompanying drawing is a diagrammatic view in section, and to exaggerated scale, of the product of the invention.

In the usual practice—the practice that, in general, I follow—the previously smelted glass is reduced to powder (called frit) and spread upon the surface of the article to be coated; the temperature then is raised, and the powdered glass is fused to form in situ the desired coherent coating.

The invention consists in following such general practice under two qualifications in circumstance—two conditions that, being established, result in superiority of bond. In the glass, as it is fused upon the surface of the iron or steel article, a reagent is found that, attacking the surface of the article, forms an iron oxide (which immediately goes into solution in the glass); and the surface of the article is irregularly protected or screened against such erosive attack. The effect is that the surface of the article is pitted, the molten glass enters the pits; and, on cooling, the solidified glass of the coating is, by reason of such surface penetration, mechanically keyed to and more firmly secured to the metal body.

There are many suitable reagents that, present in the glass, will effect oxidation of the iron surface. Generally speaking, any compound that readily gives up oxygen in the presence of iron; and, specifically, suitable reagents for the purpose indicated are the antimonates, the uranates, the manganates, and the vanadates of the alkali and alkaline-earth metals; and, of these, sodium antimonate may be taken as the type.

The glass composition may be such as the art knows, and knows to be otherwise best suited for the particular work in hand. A typical composition is as follows:

| | Parts |
|---|---|
| Feldspar | 30 |
| Silica | 16.5 |
| Borax | 27 |
| Cryolite | 16.5 |
| Fluorspar | 3.5 |
| Niter | 5 |

To such composition, for enjoyment of the present invention, sodium antimonate may be added, in the amount of 17 parts, When the glass so compounded is fused upon the surface of the iron or steel article, the sodium antimonate being in solution in the glass, the antimonic oxide—the pentoxide, $Sb_2O_5$,—the radical, becomes effective upon the iron as an oxidizing agent, forming iron oxide, and being itself reduced to a lower oxide. The iron oxide so formed goes into solution in the glass; the antimony and the sodium, in altered composition, continue in solution; and the glass penetrates and occupies whatever space is afforded by such erosion of the iron or steel surface.

The means for irregularly screening the iron or steel surface from such erosive attack are various. For example, finely divided, inert material (the oxides of aluminum, chromium, and zinc are available; bisque, mullite, and refractories generally) may be milled with the frit; and particles of such material, thus caused to be present in the fused coating of glass, will serve irregularly to protect the surface of the iron or steel article against the erosive attack described. Alternatively, such finely divided, inert material may be prepared as a slurry and spread first upon the surface of the article, and then the article may be dipped in the slip or the coating of frit may be otherwise applied. In the ensuing firing of the article a like condition will be brought about: the iron or steel surface will, by the presence of such particles of inert material, be irregularly protected against the erosive attack of the reagent carried in the fused glass. The quantity of such inert and refractory material so employed may range widely. It may with effect be as little as 0.5%. Ordinarily it will not exceed 10%.

In Fig. I of the accompanying drawing, the body of metal is indicated at 1 and the coating of glass at 2. Particles 3 of such inert and refractory material as has been indicated present on the surface of the metal afford localized and irregular protection. Elsewhere the surface of the metal is more actively attacked and eroded by the oxidizing agent carried in the molten glass; the surface of the metal is pitted; the molten glass enters the pits; and on solidification of the glass the bond is of the mechanical nature indicated.

I prefer, however, to effect such minute localized and discontinuous screening by the electrolytic deposit of isolated flakes of another metal upon the iron or steel surface. Such electrolytic deposit may be effected before the glass is applied; and by any known or preferred procedure (depending, as the metallurgist knows, upon the particular metal chosen for the purpose). But, whatever the particular procedure, the incipient electrolytic action will be intermitted while still the deposit is in the form of isolated flakes and before the deposit becomes continuous over the surface. It will be found convenient to form such a flake-like and intermittent deposit by dipping the iron or steel article into a solution of a salt of a metal more noble than iron, such in degree of concentration as to afford the effect described.

Alternatively (and preferably) the electrolytic deposit will be laid down when, in the firing, the glass is fused upon the surface of the iron or steel article. The molten glass then serves as the electrolyte. Before the application of the glass, the article may first be coated with a slurry of a suitable metallic compound. When, thereafter, the glass is applied and fused, the compound will go into solution, and from such solution the metal itself will be electroplated upon the iron or steel surface. The flakes of metal will be effective to render irregularly localized the simultaneously progressive erosive action that has already been described.

Instead of applying the metallic compound first and the glass afterward to the article to be enameled, the compound may be incorporated in the glass by being smelted with the glass, or it may be introduced as a mill addition to the frit.

In Fig. II of the drawing the discontinuous flakes of the second metal, laid down by electrolysis, are indicated at 4. They serve in the manner described to screen discontinuously the surface of the metal body 1, while permitting erosion and penetration of the molten glass that carries an oxidizing agent. When, then, the body 2 of glass solidifies, the coating will be keyed mechanically to the body of metal, after the manner here diagrammatically indicated.

Any metal that is more noble than iron—that stands lower in the electromotive series—may thus be electroplated upon the surface of the iron or steel article, and serve the purposes of the invention; practically, the operator will in his choice be limited to those metals whose suitable compounds are commercially available, and chief among these available compounds are cobalt oxide, copper carbonate, silver chloride, potassium gold chloride, and bismuth oxychloride.

In case the electro-deposit be made from the fused glass as the electrolyte, the quantity of metal compound provided and brought into solution will be carefully limited, so that no more than a deposit of locally isolated flakes shall be effected. And, in this connection, I have found, respecting the metal chosen, that the lower its position in the electromotive scale (and the more remote its position from that of iron) the smaller is the permissible maximum of the compound to be added, to attain the enjoyment of the invention. In the case of cobalt oxide, for example, the addition may effectively be in the amount of 0.2%; in the case of copper carbonate, it may be 0.1%; and in the case of potassium gold chloride, it may be 0.01%. It is because of the fact that relatively minute quantities of the more costly metals suffice, that they come to be practically serviceable. Even so, the compounds of such metals as platinum, iridium, rhodium, thallium, and osmium, entirely serviceable, are not practicable.

The quantity of metallic compound must, however, be sufficient to achieve the end described— to flake the surface of the underlying metal with isolated flakes of the more noble metal and to render localized and irregular the erosive action of the antimonate of sodium, or its equivalent. Of the metals more noble than iron there are, in the iron group, nickel and cobalt. Cobalt is serviceable. The quantity, however, requisite to achieve the effect described, must be not substantially less than 0.2% by weight of the weight of glass; and such quantity has the effect of giving to the coating of enamel the blue color characteristic of cobalt. If such coloration be not objectionable, cobalt oxide may be used; but in case such coloration is to be avoided, the invention should be practised with compounds of metals more noble than those of the iron group.

As to the quantity of reagent (sodium antimonate or its equivalent, as defined above), it will ordinarily be limited by consideration of the color and appearance of the finished article. Sodium antimonate, for example, so present in the glass and serving as a reagent in the manner described, is also serving another and distinct and (ordinarily) dominant purpose—that, namely, of opacification. Sodium antimonate, so present, affords a brilliant, white, opaque enamel coat. The quantity of the antimonate (or its equivalent) must be sufficient effectively to erode and pit and so afford the mechanical union described. As has been indicated above, 17 parts of sodium antimonate in 115.5 will suffice, and the whiteness of the product will not be diminished nor compromised. I have found the practical range, affording at once whiteness and enhanced security, to be 5–12% of the antimony pentoxide that, as I have explained, becomes effective when the antimonate goes into solution. The quantity will vary, as the art knows, according to the time and temperature of firing.

Reagents other than antimonate may be used, according to the requirements concerning the appearance of the finished article. In the case of the manganates, for example, oxide of manganese is such a penetrating and pervasive stain that these materials will be used only when the purplish color of manganese is either desired or is not objectionable.

Manifestly the reagent may be a compound of two or more of the particular substances named. Similarly, the metal salt may be a compound of salts of more than one metal.

It will be found of the glass of the composition given above by way of example, that its coefficient of thermal expansion is more closely approximate to that of iron than is usually true of ground coats employed in the enameling industry. This I note as a distinct advantage, particularly as an attendant upon my invention; for it makes for the endurance of the mechanical interlock or bond of my invention, under varying temperature conditions.

In no respect, other than those described, does the practice of my invention impose limitation upon the ordinary procedure in enamel-ware making. The slip may be prepared, the coating is applied, and the coated article is fired, all in usual manner.

I claim as my invention:

1. In the method of coating an iron or steel article with enamel, the steps that consist in providing upon the ferrous surface of the article a screen of inert material which affords localized and irregular protection against erosion, fusing upon the ferrous surface a coating of glass that contains an oxidizing agent in sufficient quantity actively to attack and erode the ferrous surface through the interstices of the screen, and allowing the so-coated article to grow cold, whereby the ferrous surface is pitted, the molten glass is caused to penetrate the pits, and the solidified coating is keyed to the metal.

2. In the method of coating an iron or steel article with white and opaque enamel, the steps that consist in providing upon the ferrous surface of the article a screen of inert material which affords localized and irregular protection against erosion, fusing upon the ferrous surface a coating of glass that contains an antimony pentoxide content of the order of 5-12%, and in so doing causing the fused glass actively to attack and erode the ferrous surface through the interstices of the screen, and allowing the so-coated article to grow cold, whereby the ferrous surface is pitted, the molten glass is caused to penetrate the pits, and the solidified coating is keyed to the metal.

3. The method herein described of coating an iron or steel article with a coating of glass free from blue cobalt coloration which consists in effecting electrodeposition upon the iron or steel surface of separate and discontinuous flakes of a metal less electropositive than cobalt, fusing upon such surface a coating of glass that contains, in addition to the usual glass-forming components, an iron-erosive ingredient selected from a group that consists of the antimonates, the uranates, the manganates, and the vanadates of the alkali and alkaline-earth metals, in quantity in the case of antimony to afford in the fused glass an antimony pentoxide ingredient of the order of 5-12%, and in the case of another erosive agent corresponding erosive effect, and allowing the so-coated article to grow cold, whereby the surface of the article is pitted, the molten glass is caused to penetrate the pits and the solidified coating is keyed to the article.

JACOB E. ROSENBERG.